United States Patent
Jeans

(10) Patent No.: US 6,508,433 B1
(45) Date of Patent: Jan. 21, 2003

(54) COLLAPSIBLE HUB ASSEMBLY

(76) Inventor: Albert H. Jeans, 820 San Lucas Ave., Mountain View, CA (US) 94043

( * ) Notice: Subject to any disclaimer, the term of this patent is extended or adjusted under 35 U.S.C. 154(b) by 0 days.

(21) Appl. No.: 09/603,250

(22) Filed: Jun. 26, 2000

(51) Int. Cl.$^7$ .............................................. B65M 16/02
(52) U.S. Cl. .................... 242/577; 242/571; 242/577.4; 242/608.4
(58) Field of Search ................................ 242/577, 571, 242/577.4, 608.4

(56) References Cited

U.S. PATENT DOCUMENTS

| | | | | |
|---|---|---|---|---|
| 1,845,526 A | * | 2/1932 | Spence, Jr. | |
| 4,009,842 A | | 3/1977 | Persha et al. | 242/71.9 |
| 4,284,250 A | | 8/1981 | Plachy et al. | 242/68.3 |
| 4,967,975 A | * | 11/1990 | Urlik | 242/581 |
| 5,002,237 A | | 3/1991 | Hirayama | 242/74.1 |
| 5,046,678 A | | 9/1991 | Beer et al. | 242/71.8 |
| 5,707,482 A | | 1/1998 | Fusselman | 156/577 |

* cited by examiner

Primary Examiner—Donald P. Walsh
Assistant Examiner—Jonathan R. Miller
(74) Attorney, Agent, or Firm—Trueman H Denny, III

(57) ABSTRACT

A collapsible hub assembly is disclosed. The collapsible hub assembly includes a hub having a slot formed therein and a first contact surface, a wedge movably positioned in the slot and including a second contact surface. The wedge is movable between a locked position and a collapsed position. With the wedge in the locked position, a material pack is wound onto the collapsible hub assembly and engages the first and second contact surfaces with a first force that fixedly connects the material pack to the hub and the wedge. The material pack can be removed from the collapsible hub assembly by moving the wedge to the collapsed position so that the magnitude of the first force is reduced and the material pack is not fixedly connected to the hub. A lock can be movably positioned in the slot to hold the wedge at the locked position. The wedge can be moved to the collapsed position by removing the lock. Unwinding of the material pack to effectuate removal of the material pack as well as the mess that unwinding the material pack can create are eliminated by the collapsible hub assembly because the material pack can be removed as one piece.

16 Claims, 14 Drawing Sheets

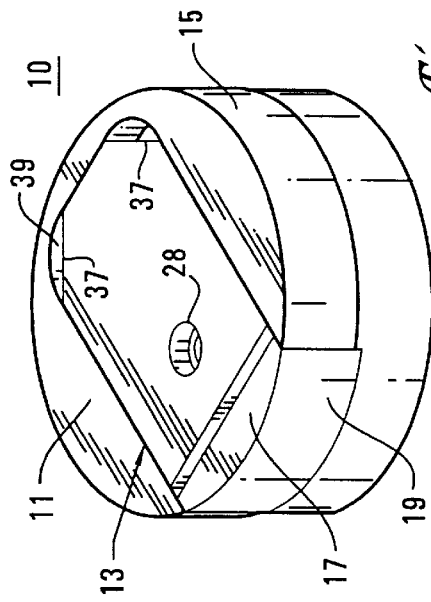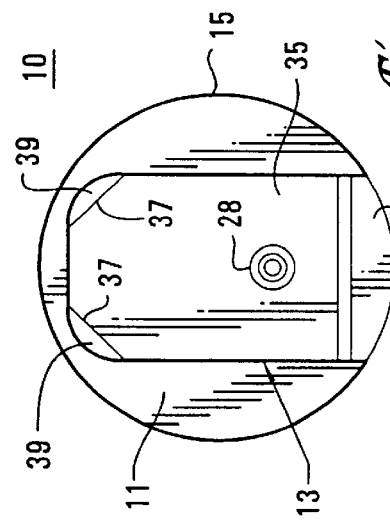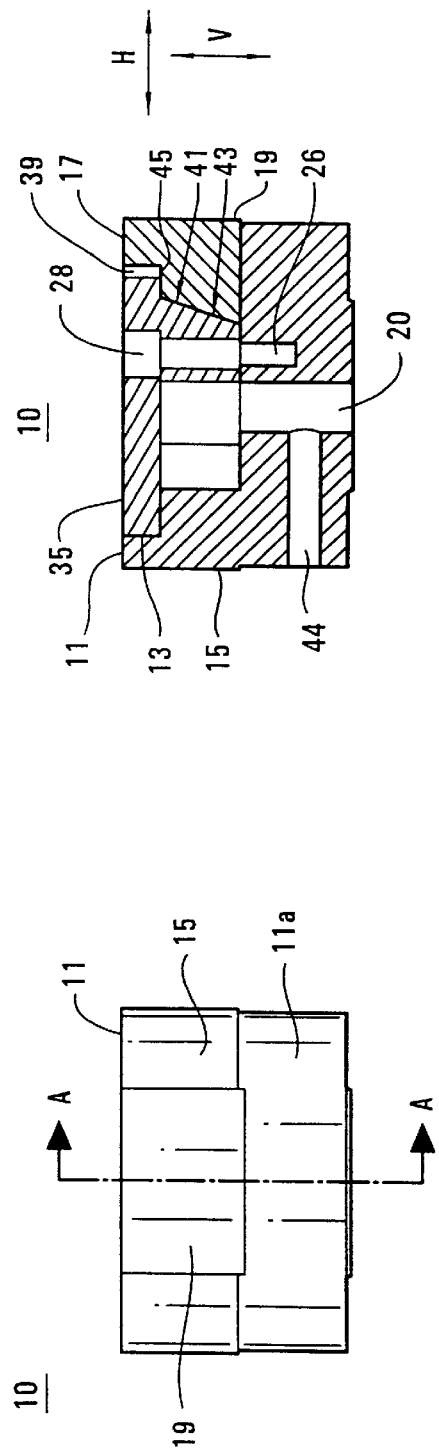

COLLAPSIBLE HUB ASSEMBLY

BACKGROUND OF THE INVENTION

The present invention relates generally to a collapsible hub assembly. More specifically, the present invention relates to a collapsible hub assembly adapted for easy removal of a material pack wound onto a hub of the collapsible hub assembly without having to unwind the material pack from the hub in order to facilitate removal of the material pack.

BACKGROUND ART

It is often desirable to quickly and efficiently remove a material from a hub (also commonly referred to as a spool or a reel) onto which the material has been wound. For instance, after conducting tests on magnetic tape, the tape can be damaged or is no longer suitable for further testing. Consequently, it is desirable to dispose of the tape. However, because the hub, reel, or spool is undamaged, it is desirable to only dispose of the tape and to keep the hub, reel, or spool.

Previously, unwanted tape was unwound from the hub, either manually or machine assisted, taking time and creating a large pile of tape. The resulting pile of tape often created a mess and the pile had to be manually gathered before the pile could be disposed of. The tape was not easy to remove from the hub as one piece because as the tape is wound onto the hub the tension on the tape creates a radially inward force on the hub that binds the tape to the hub. As additional layers of the tape are wound onto the hub the force increases. After the tape has been wound onto the hub, the tape forms a tape pack that is fixedly connected to the hub with sufficient force such that the tape pack cannot be easily removed from the hub.

FIG. 1 illustrates a prior art spool 100 that includes a hub 101 and a flange 103 that is attached to the hub 101. A tape 105 is wound 107 onto the hub 101 by rotating 109 the spool 100 about a rotational axis 111 to gather the tape 105 onto the hub 101. Tension on the tape 105 results in the tape 105 imparting a radially inward force 115 on the hub 101. The radially inward force 115 results in the tape 105 being fixedly connected to the hub 101.

In FIG. 2, the tape 105 is wound onto the hub 101 forming a tape pack 117. The tape pack 117 is fixedly connected to the hub 101 by the radially inward force 115. Although FIGS. 1 and 2 only show four arrows for the radially inward force 115, the radially inward force 115 is acting along the entire circumference of the hub 101. Consequently, the tape pack 117 is connected to the hub 101 with sufficient force such that removal of the entire tape pack 117 is difficult. For instance, because of the radially inward force 115, removal of the tape pack 117 by hand is very difficult if not impossible.

Accordingly, in FIG. 2, removal of the tape pack 117 from the spool 100 requires the tape 105 to be unwound 121 from the hub 101. Unwinding of the tape 105 can be accomplished either by advancing the tape 105 in the unwind direction of arrow 121 or by rotating 119 the spool 100 about the rotational axis 111. On the other hand, the tape can also be removed by allowing the tape to fall off or be pulled off of the hub in an axial direction. As mentioned above, unwinding the tape 105 is time consuming and the resulting pile of tape is messy. Although FIGS. 1 and 2 illustrate a tape being wound, the problems associated with the tape 105 apply to other materials including film, wire, cable, paper, textiles, and the like.

Therefore, there is a need for a hub assembly that allows a material that is wound onto a hub to be easily removed from the hub without having to unwind the material from the hub and that allows the material to be removed as one piece so that the material can be easily disposed of.

SUMMARY OF THE INVENTION

The above mentioned needs are met by the collapsible hub assembly of the present invention. The problems and disadvantages of having to unwind a material from a hub are solved by a hub assembly that includes a hub and a movable wedge. The wedge is movable between a locked position and a collapsed position. In the locked position, the material is wound onto a portion of both the hub and the wedge. The material is fixedly connected to the hub and the wedge by a force that acts radially inward on the hub and wedge. When the wedge is moved to the collapsed position, the force acting on the hub is reduced so that the material is no longed fixedly connected to the hub and the material can be removed from the hub assembly without having to unwind the material.

Advantages of the collapsible hub assembly of the present invention include: a material pack that can be easily removed from the hub it is wound onto without having to unwind the material to effect removal; the material pack can be removed as one piece so that the material pack can be easily disposed of; elimination of the messy pile cause by unwinding a material from the hub; a substantial reduction in the amount of time and effort required to remove the material from the hub; the one-piece material pack is in a compact form that is amendable for future use or for recycling of the material; and the material pack can be removed by hand.

Broadly, the present invention is embodied in a collapsible hub assembly that includes a hub having a slot formed therein, a first contact surface, and a wedge movably positioned in the slot and having a second contact surface. The wedge is movable to a locked position where a material pack to be wound onto the hub is urged into contact with the first contact surface and the second contact surface with a first force that fixedly connects the material pack to the hub and the wedge. The wedge is movable to a collapsed position where the second contact surface is disengaged from the material pack resulting in a reduction in the first force so that the material pack is no longer fixedly connected to the hub when the wedge is in the collapsed position. Consequently, when the wedge is in the collapsed position the material pack can be removed from the hub in one piece.

In one embodiment of the present invention, the collapsible hub assembly includes a flange attached to the hub and adapted to physically contain the material pack along a plane.

In another embodiment of the present invention, the collapsible hub assembly includes a lock adapted to be removably inserted into the slot. The lock is in contact with the wedge and fixedly positions the wedged at the locked position when the lock is inserted in the slot. The wedge is movable to the collapsed position by removing the lock from the slot.

In one embodiment of the present invention, the lock can include a first flange attached to the lock and adapted to physically contain the material pack along a first plane.

In another embodiment of the present invention, the hub and the lock are mounted in fixed relation to each other.

In one embodiment of the present invention, the hub and the wedge are mounted in fixed relation to each other.

In another embodiment of the present invention, the wedge and the hub form a nearly complete circle along the first and second contact surfaces when the wedge is in the locked position.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIGS. 12a through 12d are top, profile, side, and cross-sectional views of a collapsible hub assembly including a lock inserted in a slot of the hub according to the present invention.

DETAILED DESCRIPTION

Figure 1:
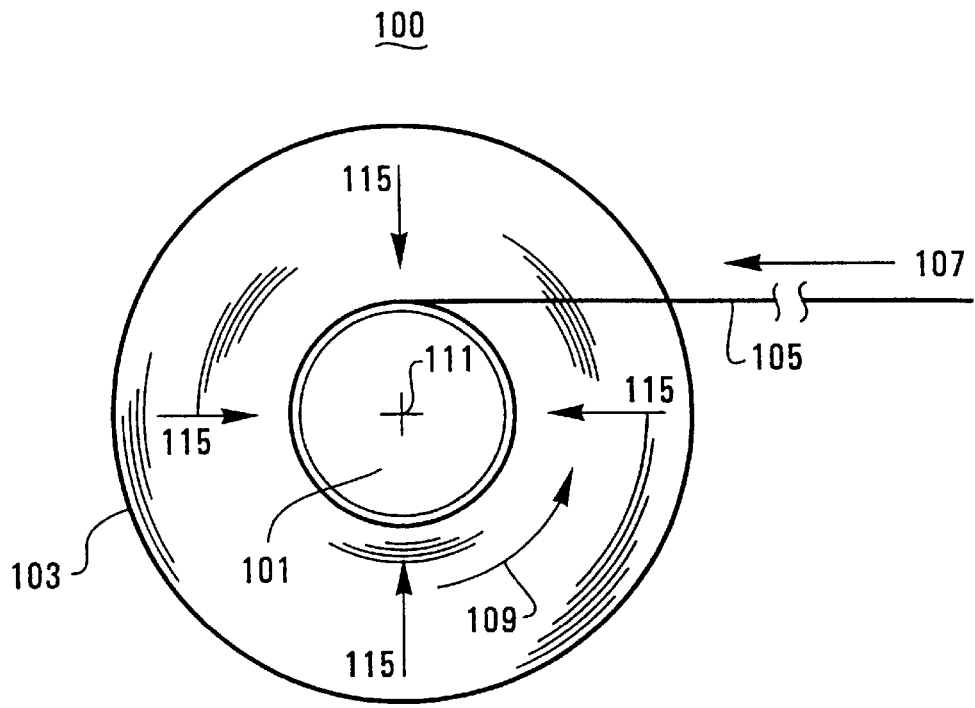
FIG. 1 is a top plan view of a prior art spool onto which a tape is being wound.
Figure 2:
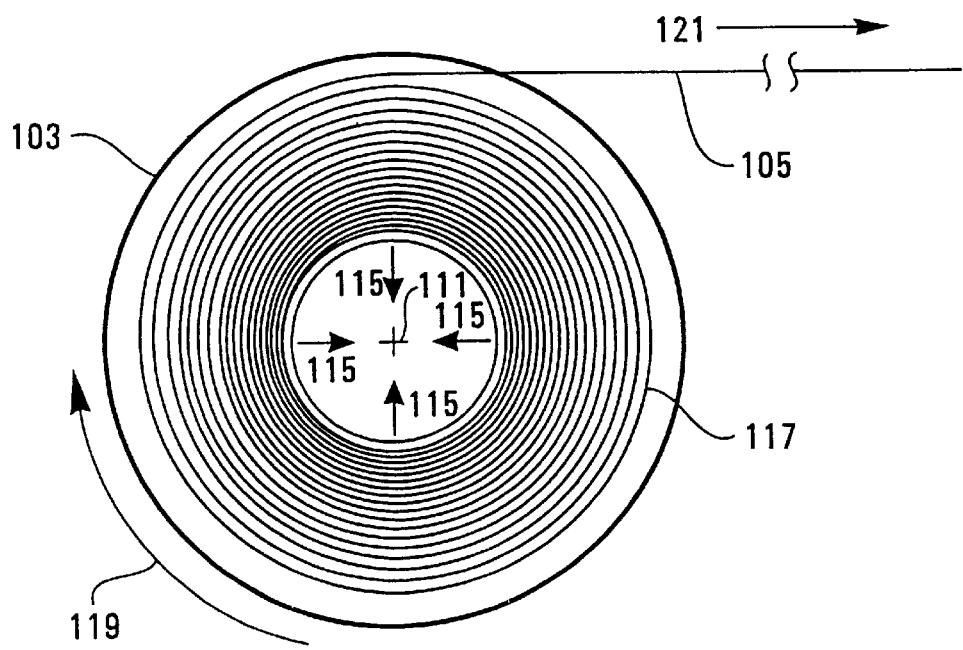
FIG. 2 is top plan view of a prior art spool having a tape pack wound thereon.

In the following detailed description and in the several figures of the drawings, like elements are identified with like reference numerals.

As shown in the drawings for purpose of illustration, the present invention is embodied in a collapsible hub assembly including a hub having a slot formed therein and having a first contact surface and a wedge movably positioned in the slot and having a second contact surface. The wedge is movable between a locked position and a collapsed position. In the locked position, a material pack to be wound onto the hub is urged into contact with the first and second contact surfaces with a first force that fixedly connects the material pack to the hub and to the wedge. In the collapsed position, the second contact surface of the wedge is disengaged (i.e. moved away from the material pack so that it no longer is in contact with the material pack) from the material pack thereby reducing the first force so that the material pack is not fixedly connected to the hub. The reduction in the first force allows the material pack to be removed from the hub in one piece.

Advantages of the collapsible hub assembly of the present invention include not having to unwind the material pack in order to remove the material pack from the hub, the ability to remove the material pack by hand, eliminating the time consumed by unwinding the material pack from the hub, and the material pack can be removed and disposed of without the mess and effort caused by a pile of unwound material.

Figure 3:
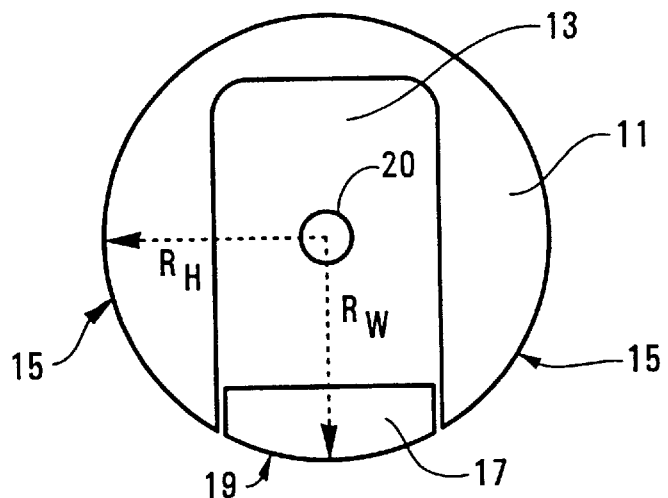
FIG. 3 is a top plan view of a collapsible hub assembly with a wedge in a locked position according to the present invention.
Figure 4:
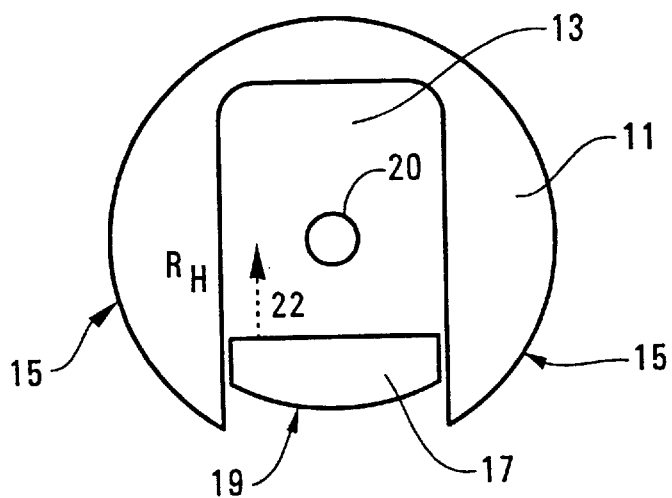
FIG. 4 is a top plan view of the collapsible hub assembly of FIG. 3 with the wedge in a collapsed position according to the present invention.

In FIG. 3, a collapsible hub assembly 10 includes a hub 11, a first contact surface 15, a slot 13 formed in the hub 11, at least one wedge 17 movably positioned in the slot 13, and the wedge 17 including a second contact surface 19. The wedge is movable between a locked position and a collapsed position. In FIG. 3, the wedge 17 is shown in the locked position. In the locked position, the first contact surface 15 of the hub 11 and the second contact surface 19 of the wedge 17 are positioned relative to each other so that a material pack (not shown) to be wound onto the collapsible hub assembly 10 will contact both the first and second contact surfaces (15 and 19) respectively. In FIG. 4., the wedge 17 is shown in the collapsed position. The wedge 17 is movable from the locked position to the collapsed position as shown by dashed arrow 22.

In one embodiment of the present invention, the collapsible hub assembly 10 can include a first substantially semi-circular shape along the first contact surface 15 and a second substantially semi-circular shape along the second contact surface 19 so that when the wedge 17 is in the locked position (see FIG. 3) the wedge 17 and the hub 11 form a nearly complete circle along the first and second contact surfaces (15 and 19) respectively. When the wedge 17 is in the collapsed position, the first substantially semi-circular shape along the first contact surface 15 of the hub 11 forms a semi-circular shape (i.e. the first contact surface 15 is not a complete circle) as illustrated in FIG. 4.

In another embodiment of the present invention, as illustrated in FIG. 3, the first contact surface 15 and the second contact surface 19 are symmetrically disposed with respect to a center point of symmetry 20 on the hub 11 when the wedge 17 is in the locked position as shown by dashed radius lines $R_H$ and $R_W$ that extend radially outward from the center point of symmetry 20, and where $R_H=R_W$. A material pack (not shown) can be wound onto the hub 11 by rotating the hub 11 about the center point of symmetry 20.

Figure 5:
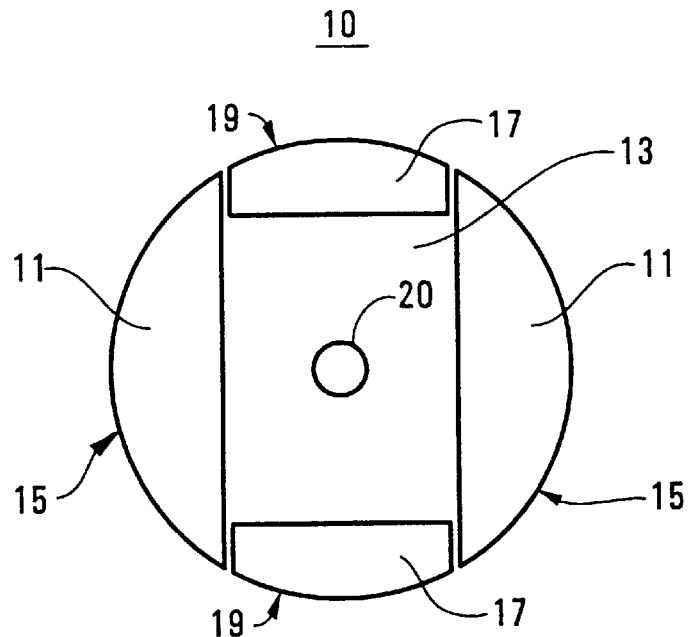
FIG. 5 is a top plan view of a collapsible hub assembly including two wedges in a locked position according to the present invention.
Figure 6:
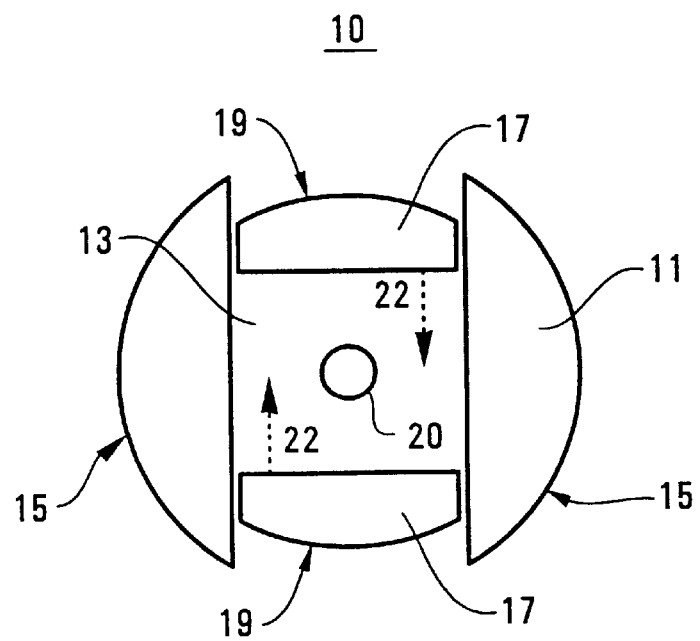
FIG. 6 is a top plan view of the collapsible hub assembly of FIG. 5 with the wedges in a collapsed position according to the present invention.

The collapsible hub assembly 10 can include more than one wedge 17. In FIGS. 5 and 6, two opposed wedges 17 are illustrated in the slot 13 of the hub 11. In FIG. 5, the wedges 17 are in the locked position and are movable to the collapsed position as shown by arrows 22 in FIG. 6. Although only two wedges are shown, the present invention is not to be construed as being limited to the configurations shown in FIGS. 5 and 6. The collapsible hub assembly 10 can include any number of wedges 17. Depending on the application in which the collapsible hub assembly 10 is used and on the magnitude of the first force, it may be desirable to use two or more of the wedges 17 so that when the wedges 17 are moved to the collapsed position the magnitude of the first force is reduced in proportion to the number of wedges 17. For example, if only one wedge 17 is used, the magnitude of the first force can be reduced by 30% when the wedge 17 is in the collapsed position. On the other hand, if two wedges 17 are used, then the magnitude of the first force can be reduced by 50% when both of the wedges 17 are in the collapsed position. The actual reduction in the first force will be application dependent. The above percentages are used for purposes of example only.

Figure 7:
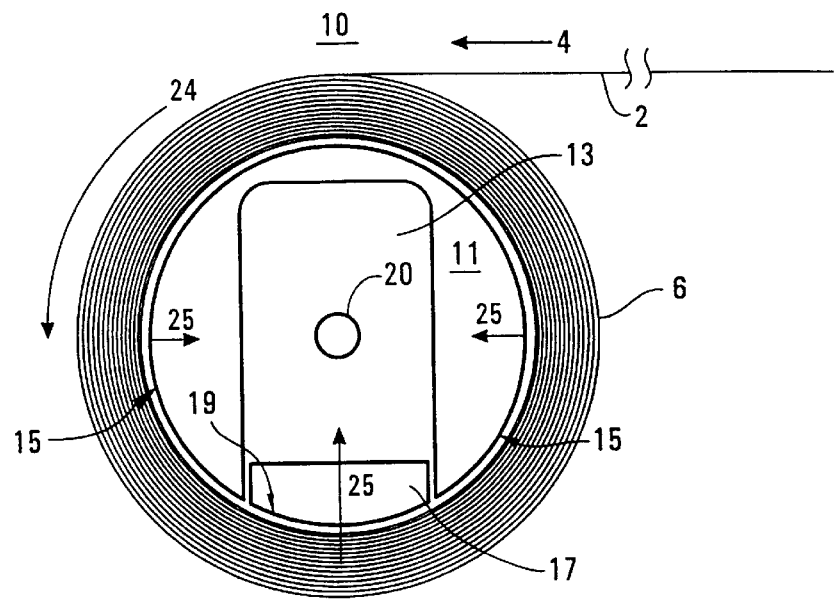
FIG. 7 is a top plan view of a material pack being wound onto the collapsible hub assembly with the wedge in the locked position according to the present invention.

In FIG. 7, a material 2 is wound 4 onto the collapsible hub assembly 10 to form a material pack 6. As mentioned above, the collapsible hub assembly 10 can be rotated 24 about the center point of symmetry 20 resulting in the material 2 being wound onto the first and second contact surfaces (15 and 19) of the hub 11 and the wedge 17. In FIG. 7, the wedge 17 is shown in the locked position. As the material 2 is wound onto the collapsible hub assembly 10, the material pack 6 exerts a first force, shown by arrows 25, in a radially inward direction on the hub 11 and the wedge 17. The first force 25 acts along the entirety of the first and second contact surfaces (15 and 19). Moreover, the first force 25 fixedly connects the material pack 6 to the hub 11 and wedge 17. As a result, the material pack 6 is difficult to remove from the collapsible hub assembly 10. The magnitude of the first force 25 will depend in part on the tension on the material 2 as it is wound 4 onto the collapsible hub assembly 10.

Figure 8:
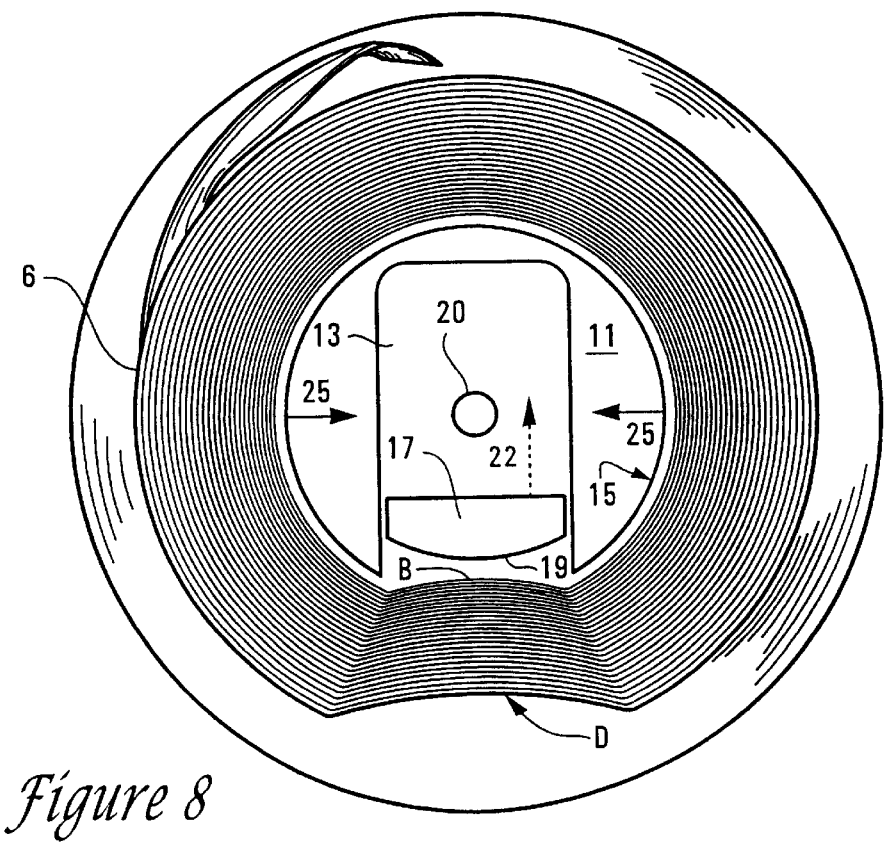
FIG. 8 is a top plan view of a material pack wound onto the collapsible hub assembly of FIG. 7 with the wedge in the collapsed position according to the present invention.

In FIG. 8, the material pack 6 is completely wound onto the collapsible hub assembly 10. The material pack 6 can be removed from the collapsible hub assembly 10 by moving the wedge 17 from the locked position to the collapsed position as shown by arrow 22. By moving the wedge 17 to the collapsed position, the magnitude of the first force 25 is reduced and the material pack 6 is no longer fixedly connected to the hub 11. Although FIG. 8 illustrates the material pack 6 being completely wound onto the collapsible hub assembly 10, the material pack 6 can be partially wound onto the onto the collapsible hub assembly 10 and then removed from the collapsible hub assembly 10 by moving the wedge 17 to the collapsed position.

In FIG. 8, after the wedge 17 is moved to the collapsed position, an inner portion of the material pack 6 that was adjacent to the second contact surface 19 can bulge B in a radially inward direction towards the center point of symmetry 20 and an outer portion of the material pack 6 can depress D in a radially inward direction towards the center point of symmetry 20.

The material 2 for the material pack 6 can include a tape, a magnetic tape, a film, a photographic film, a wire, a cable, a hose, a tube, paper, an organic material, a fiber, or a textile. It will be apparent to one skilled in the art that other materials can be used with the present invention; therefore, the present invention is not to be construed as being limited to the above mentioned materials.

The collapsible hub assembly 10 can be made from a variety of materials including but not limited to metal, metal alloy, glass, plastic, ceramic, fiberglass, composites, and wood, to name a few. Additionally, the collapsible hub assembly 10 can be made from a combination of the above mentioned materials.

Figure 9B:
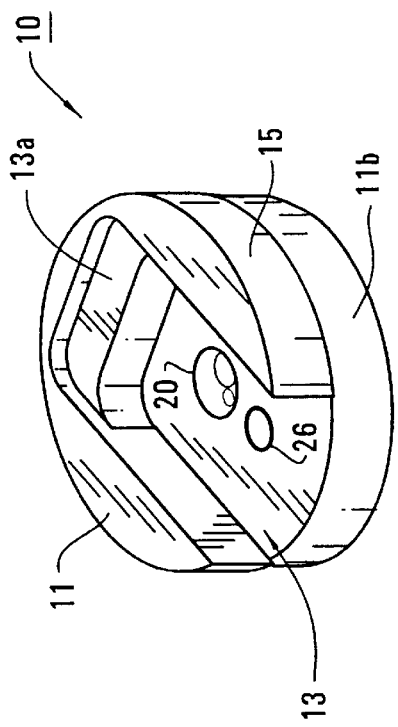
FIGS. 9a through 9d are top, profile, and side views of a hub and a slot formed in the hub according to the present invention.
Figure 9D:
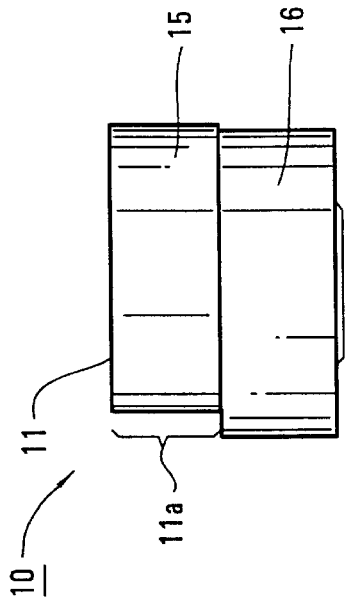
Figure 9A:
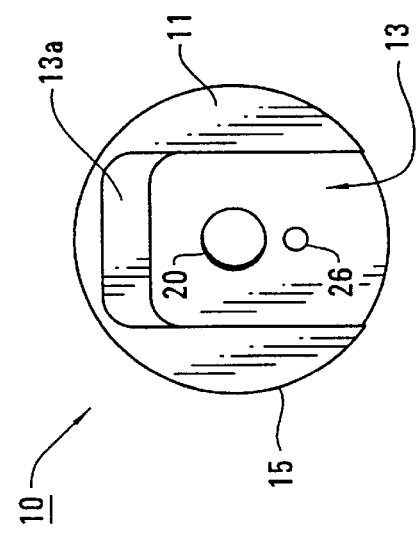
Figure 9C:
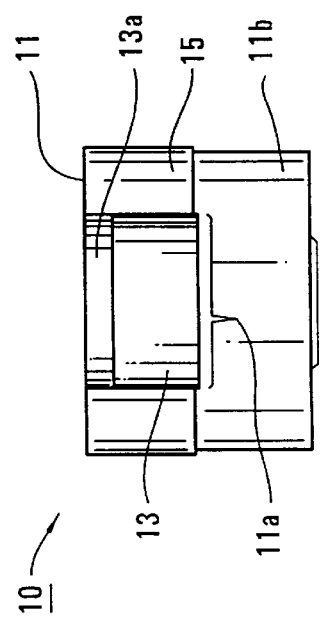
Figure 10A:
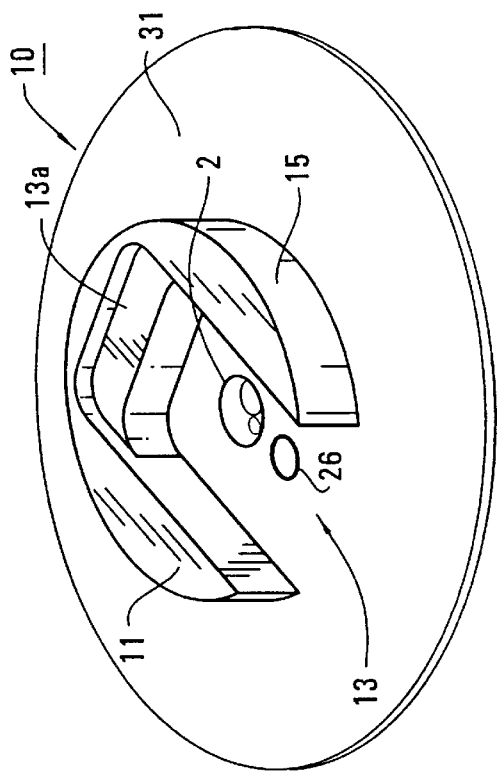
FIGS. 10a through 10d are top, profile, and side views of a hub including a flange mounted thereon according to the present invention.
Figure 10B:
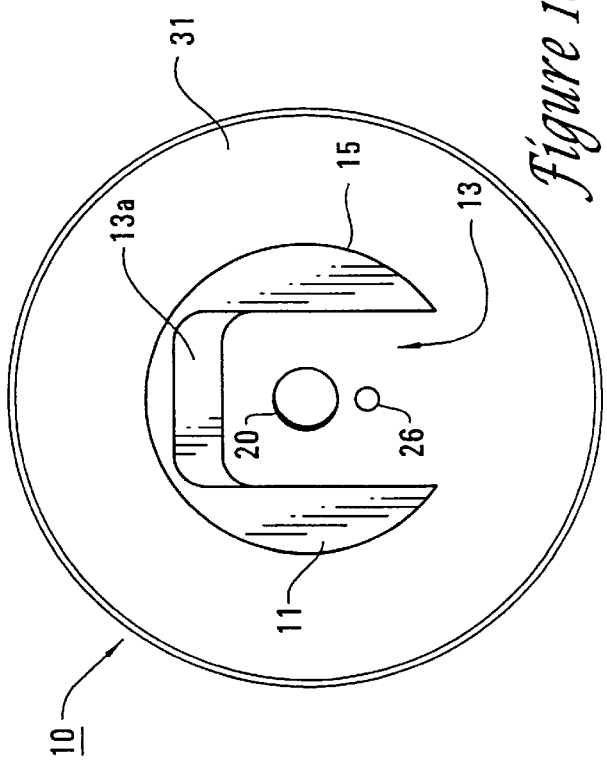
Figure 10C:
Figure 10D:
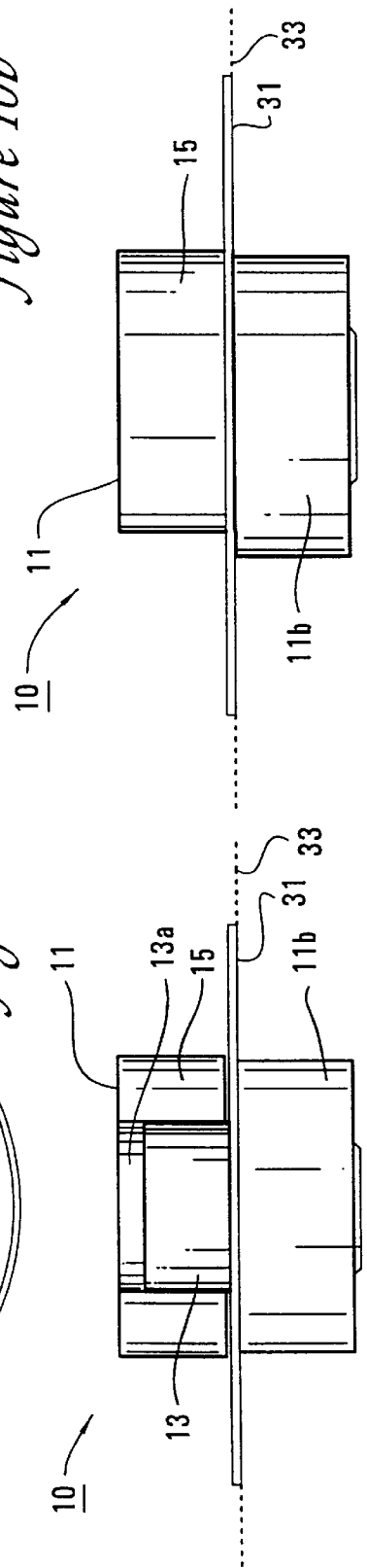
Figure 11A:
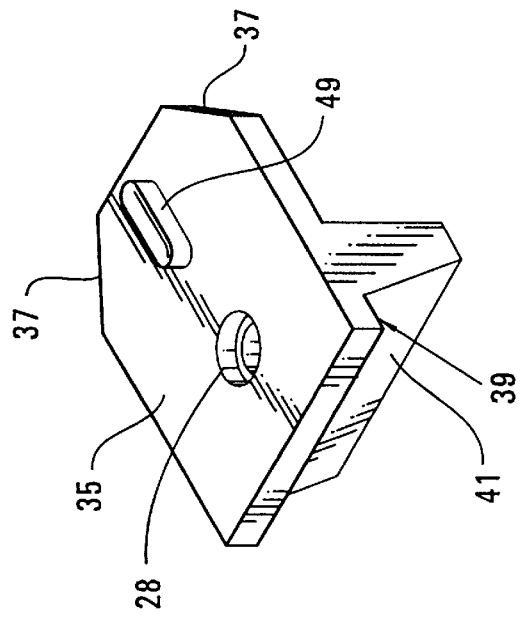
FIGS. 11a through 11d are top, profile and side views of a lock according to the present invention.
Figure 11B:
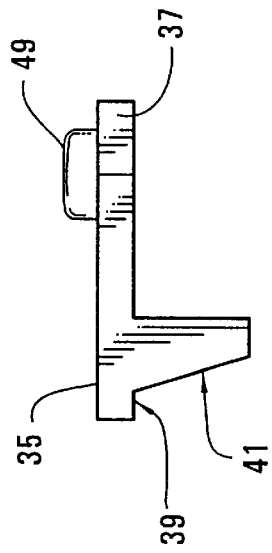
Figure 11C:
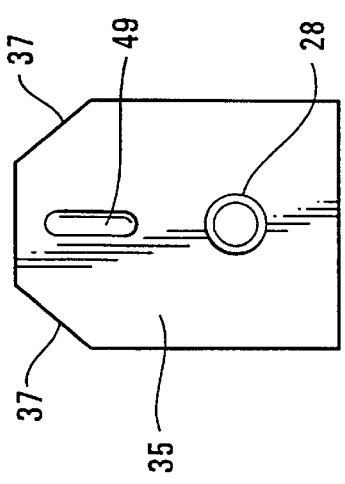
Figure 11D:
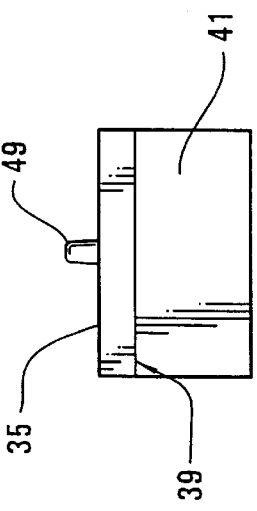

In one embodiment of the present invention, as illustrated in FIGS. 9a through 9d, the slot 13 can include an upper portion 13a for mounting a lock (not shown). In FIGS. 9c and 9d, the first contact surface 15 is formed on only a portion of the hub 11 so that when the wedge 17 (not shown) is in the locked position the second contact surface 19 (not shown) occupies the region indicated by 11a and completes the surface upon which the material pack 6 (not shown) will be wound. The collapsible hub assembly 10 can be connected to a source of rotation (not shown) by a variety of methods including forming a hole through the center point of symmetry 20 and inserting a drive shaft (not shown) in the hole (see FIGS. 9a and 9b) or a lower portion 11b of the hub 11 can be connected to the source of rotation using a drive belt (not shown) or the like (see FIGS. 9b through 9d).

In another embodiment of the present invention, as illustrated in FIGS. 10a through 10d, the collapsible hub assembly 10 includes a flange 31 attached to the hub 11. The flange 31 is adapted to contain the material pack 6 (not shown) along a plane as shown by dashed line 33 (see FIGS. 10c through 10d). The flange 31 can be a solid piece of material or the flange 31 can have perforations (not shown). The flange 31 can be made from the same materials listed above for the collapsible hub assembly 10.

In one embodiment of the present invention, the collapsible hub assembly 10 includes a lock 35, as illustrated in FIGS. 11a through 11d. The lock 35 is adapted to fit in the slot 13 (not shown) and to be inserted or removed from the slot 13. When inserted in the slot 13, the lock 35 is in contact with the wedge 17 (not shown) and fixedly positions the wedge 17 at the locked position. On the other hand, when the lock 35 is removed from the slot 13, the wedge 17 is movable to the collapsed position. The lock 35 can include at least one release portion 37 adapted to allow a tool such as a screw driver to be used to assist in removing the lock 35 from the slot 13 as will become evident in discussion of FIGS. 12a and 12b below. Additionally, the lock 35 can include a lip portion 39 and a second surface 41 adapted to contact the wedge 17 when the lock is inserted in the slot 13 as will be discussed below in reference to FIG. 12d. The lock 35 can include a knob 49 adapted to be gripped so that the lock 35 can be removed from the slot 13. The knob 49 can be adapted to be gripped by the hand, a tool, or a machine, for example. Essentially, the knob 49 is like a handle that allows for easy removal of the lock 35.

In FIGS. 12a and 12b, the lock 35 is inserted into the slot 13 of the hub 11. The lock 35 fixedly positions the wedge 17 in the locked position. The release portion 37 and the slot 13 form a cavity 39 in which a tool (not shown) can be inserted to remove the lock 37 from the slot 13 so that the wedge 17 can be moved to the collapsed position.

FIG. 12c is a side view of the collapsible hub assembly 10 and FIG. 12d is a cross-sectional view of the collapsible hub assembly 10 of FIG. 12c along section line A—A. In FIG. 12d, the wedge 17 is fixedly positioned in the locked position by the lock 35 which is inserted in the slot 13. The second surface 41 of the lock 35 is in contact with a first surface 43 of the wedge 17. The first and second surfaces (41 and 43) have complementary surface shapes. The complementary surface shapes are adapted to allow the lock 35 and the wedge 17 to disengage from each other so that the lock 35 can be removed from the slot 13 and the wedge 17 can be moved to the collapsed position. The complementary surface shapes can include a sloped shape or an arcuate shape. In FIG. 12d, the first and second surfaces (41 and 43) have a slope shape. The complementary surface shape for the first and second surfaces (41 and 43) is not limited to the sloped shape or to the arcuate shape. The complementary surface shape should be selected to allow easy removal of the lock 35. For instance, if the first and second surfaces (41 and 43) are substantially vertical and parallel to each other, then the first force could bind the lock 35 and the wedge 17 to each other with sufficient force that the lock 35 would be difficult to remove from the slot 13. Additionally, the first and second surfaces (41 and 43) are adapted to constrain movement of the wedge 17 in a horizontal direction H when the lock 35 is inserted into the slot 13. Moreover, in FIG. 12d, the lip portion 39 engages a shelf portion 45 of the wedge 17 so that movement of the wedge 17 is constrained in a vertical direction V when the lock 35 is inserted into the slot 13.

Figure 13A:
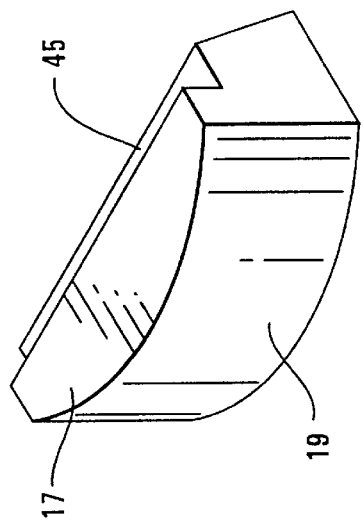
FIGS. 13a through 13d are top, profile, front, and side views of a wedge according to the present invention.
Figure 13B:
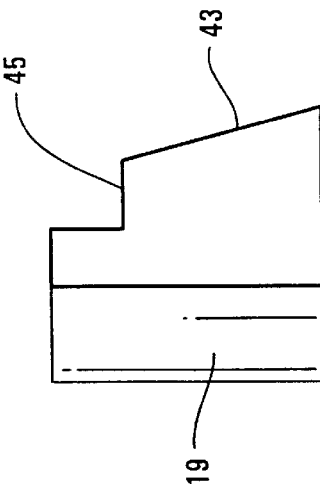
Figure 13C:
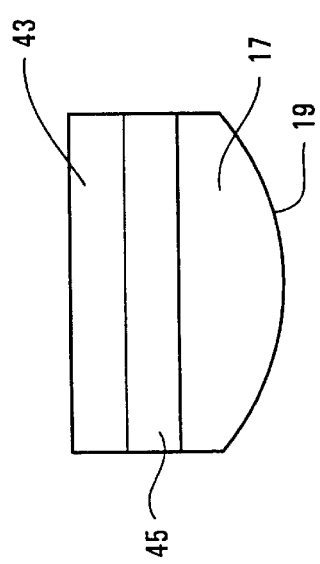
Figure 13D:
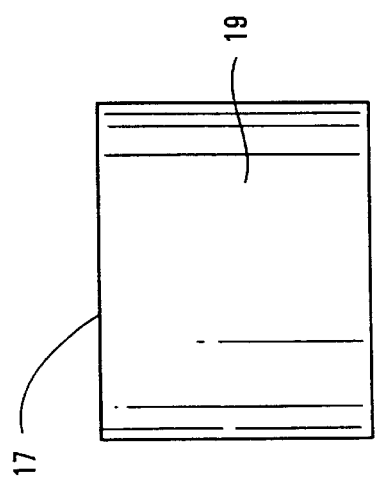

The shelf portion 45 and the first surface 43 of the wedge 17 are illustrated in greater detail in FIGS. 13a through 13d. FIGS. 13a and 13b also illustrate the substantially semi-circular shape of the second contact surface 19 of the wedge 17.

Figure 14:
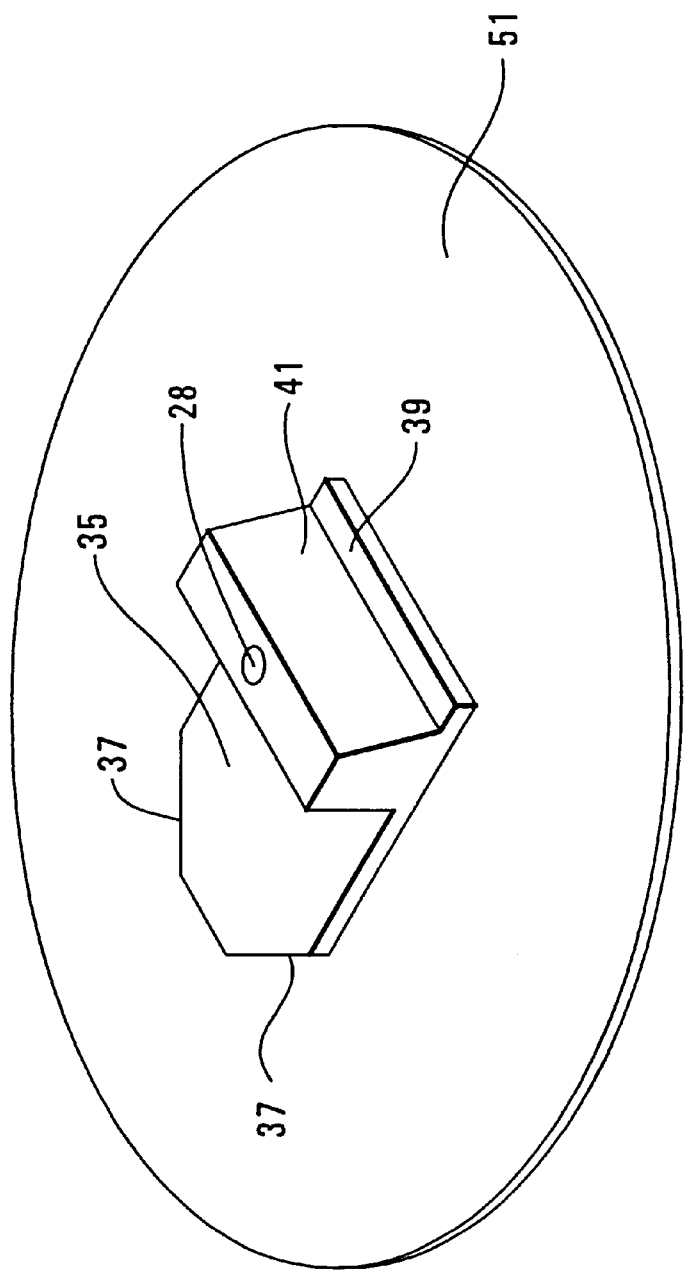
FIG. 14 is a profile view of a lock including a first flange mounted thereon according to the present invention.
Figure 15A:
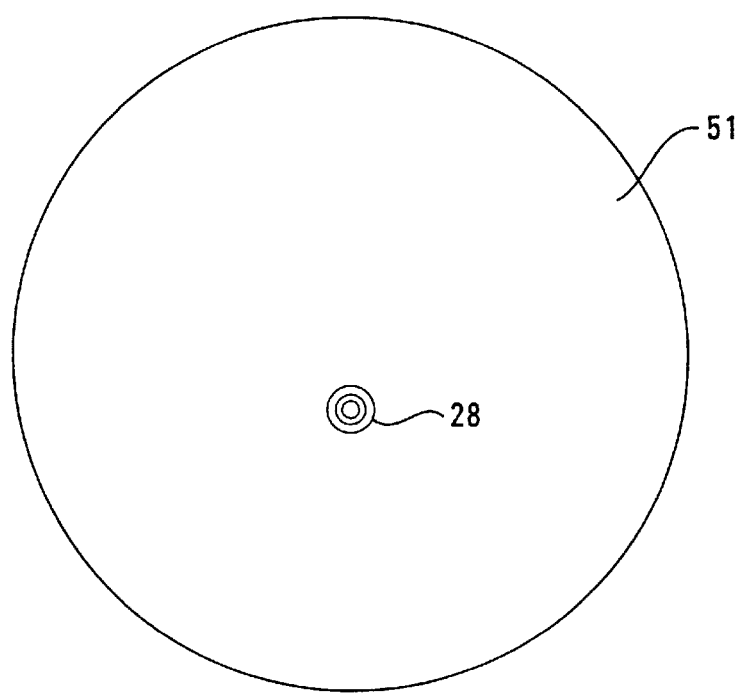
FIGS. 15a through 15d are top, profile, side, and cross-sectional views of a hub including a second flange mounted thereon according to the present invention.
Figure 15C:
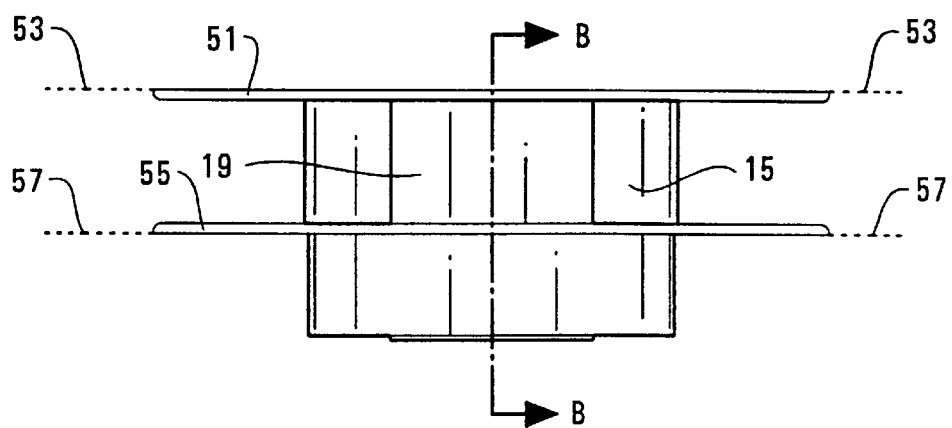
Figure 15B:
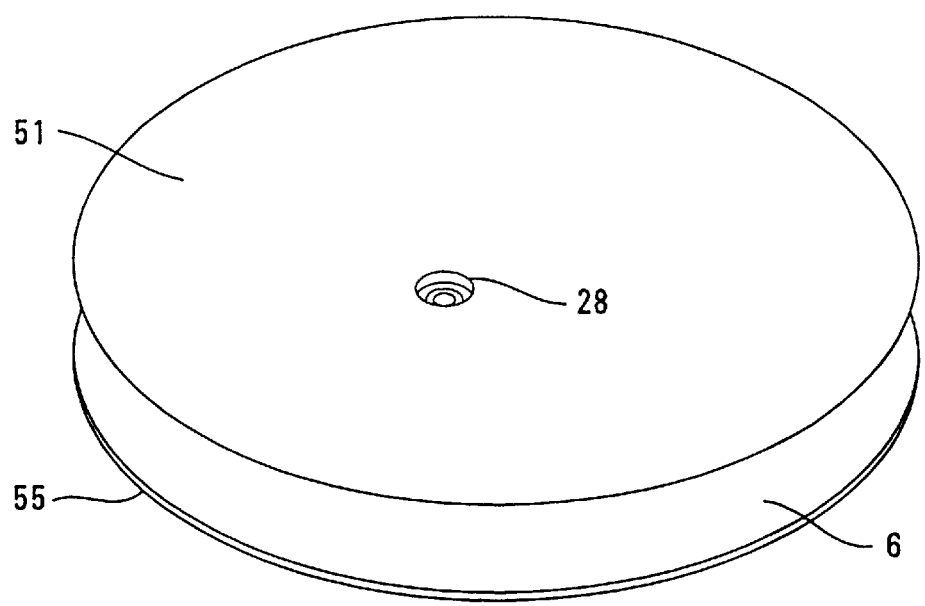
Figure 15D:
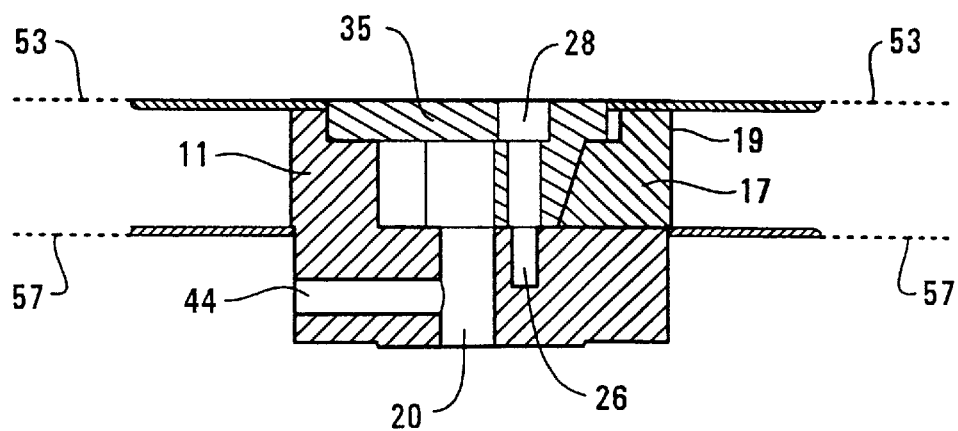

In another embodiment of the present invention, as illustrated in FIG. 14, the lock 35 can include a first flange 51 attached to the lock 35 and adapted to physically contain the material pack 6 (not shown) on a first physical plane 53 (see FIGS. 15c and 15d).

In yet another embodiment of the present invention, as illustrated in FIGS. 15a through 15d, the hub 11 includes a second flange 55 attached to the hub 11 and adapted to physically contain the material pack 6 (see FIG. 15b) on a second physical plane 57. When the lock 35 is inserted into the slot 13 of the hub 11, the first and second flanges (51 and 55) are substantially parallel to each other and physically contain the material pack 6 between the first and second physical planes (53 and 57).

In one embodiment of the present invention, the hub 11 and the lock 35 are mounted in fixed relation to each other so that the wedge 17 is held stationary in the locked position when the lock 35 is inserted into the slot 13 and the wedge 17 is not movable to the collapsed position. The hub 11 and the lock 35 can be mounted in fixed relation to each other using a fastener including but not limited to a screw, a cotter pin, a rivet, a weld, glue, an adhesive, and a nut and bolt. Preferably, a removable fastener should be used to mount the lock 35 and the hub 11 in fixed relation to each other so that the fastener can be easily removed to facilitate moving the wedge 17 to the collapsed position. However, the use of glue, an adhesive, or a weld may be desirable in some applications. Accordingly, the glue or the adhesive can be removed using an appropriate solvent, and the weld can be mechanically removed using a tool or the weld can be un-welded.

For example, in FIGS. 9a, 10a, 11a, 12a, 12d, 14, and 15d, a first hole 28 formed in the lock 35 can be adapted to receive a screw (not shown). Similarly, in the hub 11, a second hole 26 can threaded to retain the screw so that the hub 11 and the lock 35 are mounted in fixed relation to each other. For example, in FIG. 15d, the first hole 28 is aligned with the second hole 26 when the lock 35 is inserted into the slot 13 so that the screw (not shown) can be used to mount the hub 11 and the lock 35 in fixed relation to each other.

In another embodiment of the present invention, when the wedge 17 is in the locked position, the wedge 17 and the hub 11 are mounted in fixed relation to each other so that the wedge 17 is held stationary at the locked position. Accordingly, the first force 25 is prevented from urging the wedge 17 to the collapsed position. The hub 11 and the wedge 17 can be mounted in fixed relation to each other using a fastener including but not limited to a screw, a cotter pin, a rivet, a weld, glue, an adhesive, and a nut and bolt.

Figure 16A:
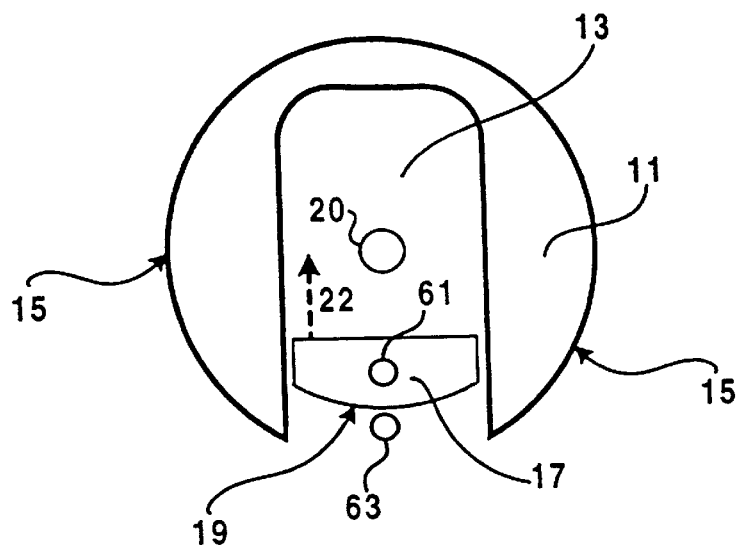
FIGS. 16a and 16b are top and cross-sectional views of a wedge and a hub adapted to be mounted in fixed relation to each other according to the present invention.
Figure 16B:
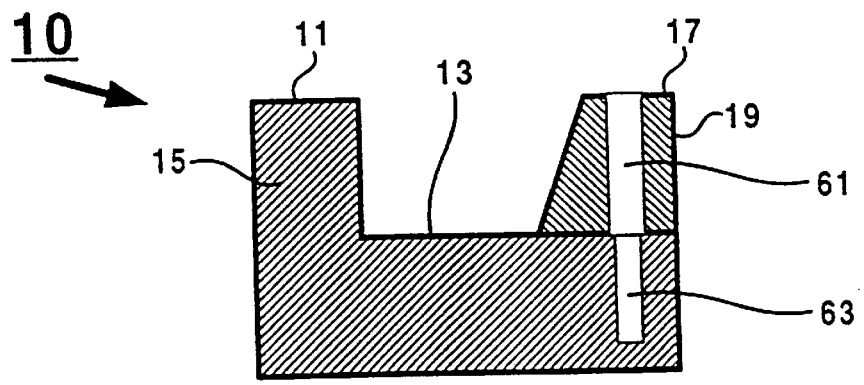

For example, in FIGS. 16a and 16b, a first hole 61 formed in the wedge 17 can be adapted to receive a screw (not shown). Similarly, in the hub 11, a second hole 63 can threaded to retain the screw so that the hub 11 and the wedge 17 are mounted in fixed relation to each other. Note, in FIG. 16a, the wedge 17 is in the collapsed position so that the second hole 63 is visible. In FIG. 16b, the wedge 17 is in the locked position and the first and second holes (61 and 63) are aligned with each other so that the screw can be inserted into the holes. The wedge 17 can be moved to the collapsed position by removing the screw.

Figure 17:
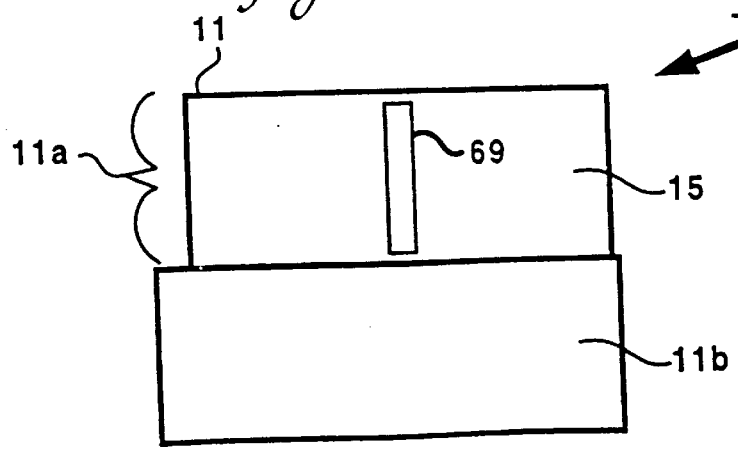
FIG. 17 is a side view of a aperture formed in a first contact surface of a hub according to the present invention.

In one embodiment of the present invention, as illustrated in FIG. 17, the hub 11 includes an aperture 69 formed in the first contact surface 15. The aperture 69 extends radially inward of the first contact surface 15 and is adapted to receive a portion of the material pack 6 (not shown). Prior to winding the material pack 6 onto the hub 11, the portion is connected to the hub 11 by inserting it into the aperture 69. Consequently, relative motion between the hub 11 and the material pack 6 results in the material pack being wound onto the hub 11. The shape of the aperture 69 will depend on the type of material 2 being wound onto the hub 11. For instance, if the material 2 is a wire (not shown), then the aperture can have a circular shape adapted to receive the wire. On the other hand, if the material 2 is a film or tape, the aperture 69 can have a rectangular shape adapted to receive the film/tape as shown in FIG. 17.

Figure 18A:
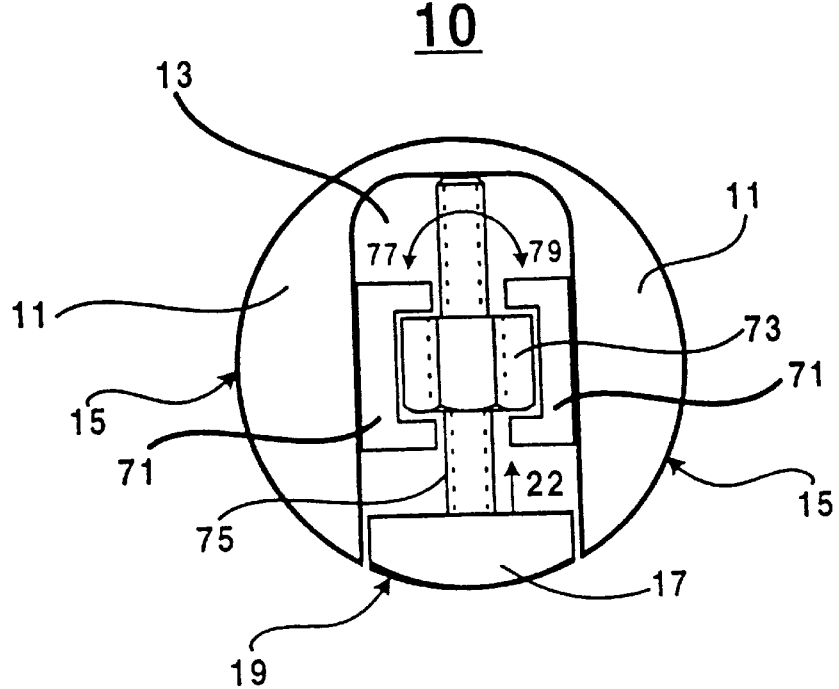
FIGS. 18a and 18b are top plan views of a lead screw and a spring used to movably position a wedge between a locked and a collapsed position according to the present invention.

In another embodiment of the present invention, as illustrated in FIG. 18a, the wedge 17 is held at the locked position by a lead screw 71 (i.e. a vise) positioned in the slot 13. The lead screw 71 includes a handle 73 (i.e. a thumb wheel) rotatably mounted in the lead screw 71 and a screw 75 movably connected to the handle 73. The screw 75 is connected to the wedge 17 and to the handle 73. Both the handle 73 and the screw 75 have complementary threads (not shown) that are adapted to move the wedge 17 to the locked position by rotating the handle 73 in a first direction 77 and to move the wedge 17 to the collapsed position (as shown by arrow 22) by rotating the handle 73 in a second direction 79.

Figure 18B:
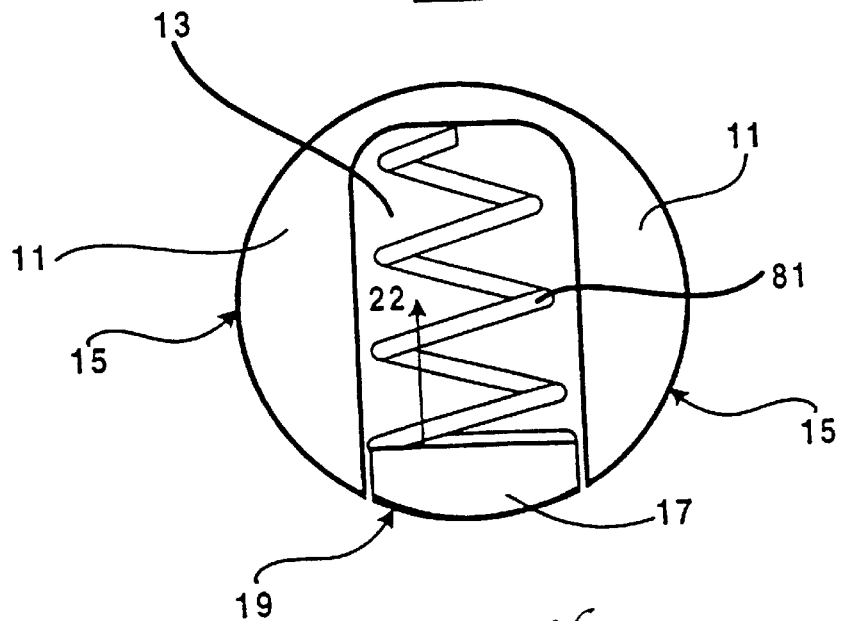

Alternatively, a spring 81 positioned in the slot 13 can be used to urge the wedge 17 to the locked position, as illustrated in FIG. 18b. The wedge 17 can be moved to the collapsed position (as shown by arrow 22) by compressing the spring 81. The spring 81 should urge the wedge 17 into the locked position with a force greater than the first force 25 so that the second contact surface 19 remains in contact with the material pack 6 (not shown).

In FIGS. 12d and 15d, the collapsible hub assembly 10 can be connected to a source of rotation by inserting a drive shaft (not shown) connected to the source of rotation into a shaft hole formed through the center point of symmetry 20 on the hub 11. The hub 11 can be fixedly connected to the drive shaft by forming a connecting hole 44 that connects with the shaft hole. The connecting hole 44 can be threaded to accept a screw (not shown) that fixedly connects the hub 11 to the drive shaft.

For all of the embodiments described herein, the collapsible hub assembly 10, the hub 11, the wedge 17, the lock 35, and the flanges 31, 51, and 55 can be made using a variety of processes including but not limited to machining, casting, stamping, and injection molding.

Although several embodiments of the present invention have been disclosed and illustrated, the invention is not limited to the specific forms or arrangements of parts so described and illustrated. The invention is only limited by the claims.

What is claimed is:

1. A collapsible hub assembly, comprising:
   a hub adapted to be rotated about a center point of symmetry and including a slot formed in the hub and a first contact surface; and
   at least one wedge positioned in the slot, the wedge including a second contact surface, and the wedge adapted to be linearly movable in the slot along a radius line through the center point of symmetry,
   the wedge is linearly movable to a locked position wherein a material pack that is wound onto the hub is urged into contact with the first and second contact surfaces with a first force that fixedly connects the material pack to the hub and the wedge, and
   the wedge is linearly movable to a collapsed position wherein the second contact surface is disengaged from the material pack thereby reducing the first force so that the material pack is not fixedly connected to the hub.

2. The collapsible hub assembly of claim 1 and further comprising a flange attached to the hub and adapted to physically contain the material pack along a plane.

3. The collapsible hub assembly of claim 1 and further comprising:
   a lock adapted to be removably inserted into the slot,
   the lock is in contact with the wedge and fixedly positions the wedge at the locked position when the lock is inserted into the slot, and
   wherein when the lock is removed from the slot the wedge is movable to the collapsed position.

4. The collapsible hub assembly of claim 3 and further comprising a first flange attached to the lock and adapted to physically contain the material pack along a first plane when the lock is inserted into the slot.

5. The collapsible hub assembly of claim 4 and further comprising a second flange attached to the hub and adapted to physically contain the material pack along a second plane.

6. The collapsible hub assembly of claim 3, wherein the hub and the lock are mounted in fixed relation to each other so that the wedge is held stationary in the locked position and the wedge is not movable to the collapsed position.

7. The collapsible hub assembly of claim 6, wherein a fastener selected from the group consisting of a screw, a cotter pin, a rivet, a weld, glue, an adhesive, and a nut and bolt is adapted to mount the hub and the lock in fixed relation to each another.

8. The collapsible hub assembly of claim 6, wherein when the wedge is in the locked position a first surface of the wedge is in contact with a second surface of the lock and the first and second surfaces have a complementary surface shape.

9. The collapsible hub assembly of claim 8, wherein the complementary surface shape is a shape selected from the group consisting of a sloped shape and a arcuate shape.

10. The collapsible hub assembly of claim 3, wherein the lock includes a knob adapted to be gripped so that the wedge can be moved to the collapsed position by gripping the knob to remove the lock from the slot.

11. The collapsible hub assembly of claim 1, wherein the hub has a first substantially semi-circular shape along the first contact surface and the wedge has a second substantially semi-circular shape along the second contact surface so that when the wedge is in the locked position the wedge and the hub form a nearly complete circle along the first and second contact surfaces.

12. The collapsible hub assembly of claim 11, wherein the first and second contact surfaces are symmetrically disposed with respect to a center point of symmetry on the hub when the wedge is in the locked position, whereby the material pack can be wound onto the hub by rotating the hub about the center point of symmetry.

13. The collapsible hub assembly of claim 1, wherein at the locked position, the wedge and the hub are mounted in fixed relation to each other so that the wedge is held stationary at the locked position.

14. The collapsible hub assembly of claim 13, wherein a fastener selected from the group consisting of a screw, a cotter pin, a rivet, a weld, glue, an adhesive, and a nut and bolt is adapted to mount the wedge and the hub in fixed relation to each another.

15. The collapsible hub assembly of claim 1, wherein the material pack that is wound onto the hub is a pack of flexible material selected from the group consisting of a tape, a magnetic tape, a film, a photographic film, a wire, a cable, a hose, a tube, paper, an organic material, a fiber, and a textile.

16. The collapsible hub assembly of claim 1 and further comprising:
   an aperture formed in the first contact surface of the hub and adapted to receive a portion of the material pack, and
   wherein prior to winding the material pack onto the hub, the portion is connected to the hub by inserting the portion in the aperture so that relative motion between the hub and the material pack results in the material pack being wound onto the hub.

* * * * *